(12) United States Patent
Nakagawara

(10) Patent No.: US 10,986,256 B2
(45) Date of Patent: Apr. 20, 2021

(54) IMAGE CAPTURING APPARATUS CAPABLE OF EFFECTIVELY REDUCING THE INFLUENCE OF NOISE CAUSED BY AN AUXILIARY DEVICE ATTACHED TO THE IMAGING APPARATUS

(71) Applicant: CANON KABUSHIKI KAISHA, Tokyo (JP)

(72) Inventor: Naoyuki Nakagawara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/453,765

(22) Filed: Jun. 26, 2019

(65) Prior Publication Data
US 2020/0007724 A1 Jan. 2, 2020

(30) Foreign Application Priority Data
Jun. 29, 2018 (JP) .............................. JP2018-125289

(51) Int. Cl.
*H04N 5/225* (2006.01)
*G03B 17/56* (2021.01)
*G03B 17/14* (2021.01)

(52) U.S. Cl.
CPC ........... *H04N 5/2254* (2013.01); *G03B 17/14* (2013.01); *G03B 17/565* (2013.01)

(58) Field of Classification Search
CPC .. H04N 5/2254; H04N 5/23209; G03B 17/14; G03B 17/565; G03B 7/20
See application file for complete search history.

(56) References Cited

U.S. PATENT DOCUMENTS

| 8,294,792 | B2 * | 10/2012 | Kawanami | ......... H04N 5/23209 |
| | | | | 348/241 |
| 2005/0237417 | A1 * | 10/2005 | Miyasaka | .............. G02B 15/10 |
| | | | | 348/335 |
| 2009/0213233 | A1 * | 8/2009 | Kido | ...................... G03B 7/093 |
| | | | | 348/208.4 |

(Continued)

FOREIGN PATENT DOCUMENTS

| CN | 1532542 A | 9/2004 |
| CN | 101322397 A | 12/2008 |

(Continued)

OTHER PUBLICATIONS

The above documents were cited in a Dec. 31, 2020 Chinese Office Action, a copy of which is enclosed with an English Translation, that issued in Chinese Patent Application No. 201910567320.8.

*Primary Examiner* — Luong T Nguyen
(74) *Attorney, Agent, or Firm* — Cowan, Liebowitz & Latman, P.C.

(57) ABSTRACT

An image capture apparatus determines a maximum power to be supplied from the image capture apparatus to an auxiliary device detachably attached to the image capture apparatus, based on information regarding a distance between a noise source included in the auxiliary device and an image sensor included in the image capture apparatus. The image capture apparatus then supplies power to the auxiliary device, without exceeding the determined maximum power and thereby effectively reduces the influence of noise caused by the auxiliary device, on the image sensor and a captured image.

17 Claims, 6 Drawing Sheets

(56) References Cited

U.S. PATENT DOCUMENTS

| | | | |
|---|---|---|---|
| 2011/0052185 A1* | 3/2011 | Urakami | G03B 17/00 |
| | | | 396/530 |
| 2011/0096206 A1* | 4/2011 | Okazaki | H04R 3/005 |
| | | | 348/241 |
| 2013/0271851 A1 | 10/2013 | Souma | |
| 2014/0063624 A1 | 3/2014 | Morooka | |

FOREIGN PATENT DOCUMENTS

| | | |
|---|---|---|
| CN | 101938602 A | 1/2011 |
| CN | 102868840 A | 1/2013 |
| CN | 106031161 A | 10/2016 |
| JP | 2003-315650 A | 11/2003 |
| JP | 2007-116371 A | 5/2007 |
| JP | 2008-028655 A | 2/2008 |
| JP | 2008-263466 A | 10/2008 |

* cited by examiner

F I G. 5A

| POWER MODE | MAXIMUM POWER SUPPLY |
|---|---|
| Full Power Mode | 10W |
| High Power Mode | 7W |
| Mid Power Mode | 5W |
| Low Power Mode | 3W |

F I G. 5B

| DISTANCE BETWEEN NOISE SOURCE OF LENS AND IMAGE SENSOR \ ISO SENSITIVITY | 100 | 400 | 1600 | 3200 | 6400 | 12800 | 25600 | 51200 | 102400 |
|---|---|---|---|---|---|---|---|---|---|
| 30mm OR LESS | Full | Full | Full | High | Mid | Mid | Low | Low | Low |
| 30mm~40mm | Full | Full | Full | Full | High | Mid | Mid | Low | Low |
| 40mm~50mm | Full | Full | Full | Full | High | High | Mid | Mid | Low |
| 50mm~60mm | Full | Full | Full | Full | Full | High | High | Mid | Mid |
| 60mm~70mm | Full | Full | Full | Full | Full | Full | Full | High | High |
| 70mm OR MORE | Full | Full | Full | Full | Full | Full | Full | Full | Full |

IMAGE CAPTURING APPARATUS CAPABLE OF EFFECTIVELY REDUCING THE INFLUENCE OF NOISE CAUSED BY AN AUXILIARY DEVICE ATTACHED TO THE IMAGING APPARATUS

BACKGROUND OF THE INVENTION

Field of the Invention

The present invention relates to an image capture apparatus, an auxiliary device of the image capture apparatus, a control method of the image capture apparatus, and a control method of the auxiliary device.

Description of the Related Art

Various auxiliary devices are attachable to and detachable from an image capture apparatus. Typical auxiliary devices are accessories including, but not limited to, an interchangeable lens, a mount adaptor, a teleconverter, a flash, a GPS receiver, a wireless communication adaptor, an electronic viewfinder, and an assistant grip. These auxiliary devices include built-in electric circuits and mechanical parts and also have electric contacts that communicate with the image capture apparatus and receive power supplied from the image capture apparatus.

Sensitivity of image capture apparatuses has advanced in recent years, and sensitivity as high as an International Organization for Standardization (ISO) level in the hundreds of thousands (standard output sensitivity) has been realized. However, image sensors have become more susceptible to exogenous noise. For example, magnetic noise caused by an operation of an interchangeable lens and a ripple voltage or current can have an influence on a captured image. To reduce such an influence on the captured image, one known method is to limit the operations of the interchangeable lens in accordance with the model and ISO sensitivity of a camera body to which the interchangeable lens is attached (see Japanese Patent Laid-Open No. 2008-263466).

Noise caused by an auxiliary device attached to a camera influences operations of an image sensor and an image signal. This influence increases as the distance between a noise source included in the auxiliary device and the image sensor decreases. Thus, for example, when an interchangeable lens includes a noise source, a mirrorless camera is more susceptible to noise than a single-lens reflex camera with a mirror box.

However, the method disclosed in Japanese Patent Laid-Open No. 2008-263466 limits the operations of the interchangeable lens based on the model and ISO sensitivity of the camera, and does not reflect the distance between the noise source and the image sensor. The distance between the noise source and the image sensor varies depending on the combination of the interchangeable lens and the camera. For this reason, the method disclosed in Japanese Patent Laid-Open No. 2008-263466 may limit the operations of the interchangeable lens either needlessly or insufficiently.

SUMMARY OF THE INVENTION

The present invention is conceived in view of the stated issue of the related art. The present invention provides: an image capture apparatus capable of effectively reducing the influence of noise caused by an auxiliary device attached to the image capture apparatus, on an image sensor and a captured image; the auxiliary device of the image capture apparatus; a control method of the image capture apparatus; and a control method of the auxiliary device.

According to an aspect of the present invention, there is provided an image capture apparatus, comprising: one or more processors that, when executing a computer program stored in a memory, function as: a determination unit configured to determine a maximum power to be supplied from the image capture apparatus to an auxiliary device detachably attached to the image capture apparatus, based on information regarding a distance between a noise source included in the auxiliary device and an image sensor included in the image capture apparatus; and a control unit for controlling power supplied to the auxiliary device, without exceeding the maximum power determined by the determination unit, wherein the determination unit determines the maximum power so that the maximum power to be smaller in a case where a distance based on the information is a second distance than in a case where the distance is a first distance, and wherein the second distance is shorter than the first distance.

According to another aspect of the present invention, there is provided an auxiliary device of an image capture apparatus, the auxiliary device comprising: a memory that stores location information regarding a noise source included in the auxiliary device; and one or more processors that, when executing a program stored in a memory, function as: an output unit configured to output the location information to the image capture apparatus to which the auxiliary device is attached to the image capture apparatus.

According to a further aspect of the present invention, there is provided an auxiliary device of an image capture apparatus, the auxiliary device comprising: a memory that stores information regarding a length of the auxiliary device; and one or more processors that, when executing a program stored in a memory, function as: an output unit configured to output the information regarding the length to the image capture apparatus to which the auxiliary device is attached to the image capture apparatus.

According to another aspect of the present invention, there is provided a control method of an image capture apparatus, comprising: determining a maximum power to be supplied from the image capture apparatus to an auxiliary device detachably attached to the image capture apparatus, based on information regarding a distance between a noise source included in the auxiliary device and an image sensor included in the image capture apparatus; and supplying power to the auxiliary device, without exceeding the maximum power determined in the determining, wherein the determining determines the maximum power so that the maximum power to be smaller in a case where a distance based on the information is a second distance than in a case where the distance is a first distance, and wherein the second distance is shorter than the first distance.

According to a further aspect of the present invention, there is provided a control method of an auxiliary device of an image capture apparatus, wherein the auxiliary device includes a memory that stores location information regarding a noise source included in the auxiliary device, the control method comprising, outputting the location information to the image capture apparatus to which the auxiliary device is attached to the image capture apparatus.

According to another aspect of the present invention, there is provided a non-transitory computer-readable medium storing a program causing, when executed, a computer to function as an image capture apparatus, comprising: a determination unit configured to determine a maximum power to be supplied from the image capture apparatus to an auxiliary device detachably attached to the image capture apparatus, based on information regarding a distance between a noise source included in the auxiliary device and an image sensor included in the image capture apparatus; and a control unit for controlling power supplied to the auxiliary device, without exceeding the maximum power determined by the determination unit, wherein the determination unit determines the maximum power so that the maximum power to be smaller in a case where a distance based on the information is a second distance than in a case where the distance is a first distance, and wherein the second distance is shorter than the first distance.

Further features of the present invention will become apparent from the following description of exemplary embodiments with reference to the attached drawings.

BRIEF DESCRIPTION OF THE DRAWINGS

FIG. 5A illustrates an example of correspondence between a power mode and a maximum power supply according to an embodiment.

FIG. 5B illustrates an exemplary relationship between a distance from a noise source to an image sensor and a determined power mode.

DESCRIPTION OF THE EMBODIMENTS

Exemplary embodiments of the present embodiment will now be described in detail in accordance with the accompanying drawings. The following describes exemplary embodiments applying the present invention to an interchangeable lens, which is an example of an auxiliary device (an accessary) attachable to and detachable from an image capture apparatus. However, the present invention is applicable to any auxiliary device that has a part or a circuit that can be a noise source that affects an image sensor or a peripheral circuit of a camera. Examples of such an auxiliary device include, but are not limited to, a mount adaptor, a teleconverter, a flash, a GPS receiver, a wireless communication adaptor, an electronic viewfinder, and an assistant grip. Moreover, the following describes exemplary embodiments applying the present invention to an interchangeable lens digital camera, which is an example of an image capture apparatus. However, the present invention is applicable to any electronic device that has an imaging function and is a device to and from which an auxiliary device can be attached and detached. Examples of such an electronic device include, but are not limited to, a video camera, a computer device (such as a personal computer, a tablet computer, and a PDA), a mobile phone, a smartphone, a game machine, a robot, a drone, and a drive recorder.

Figure 1:
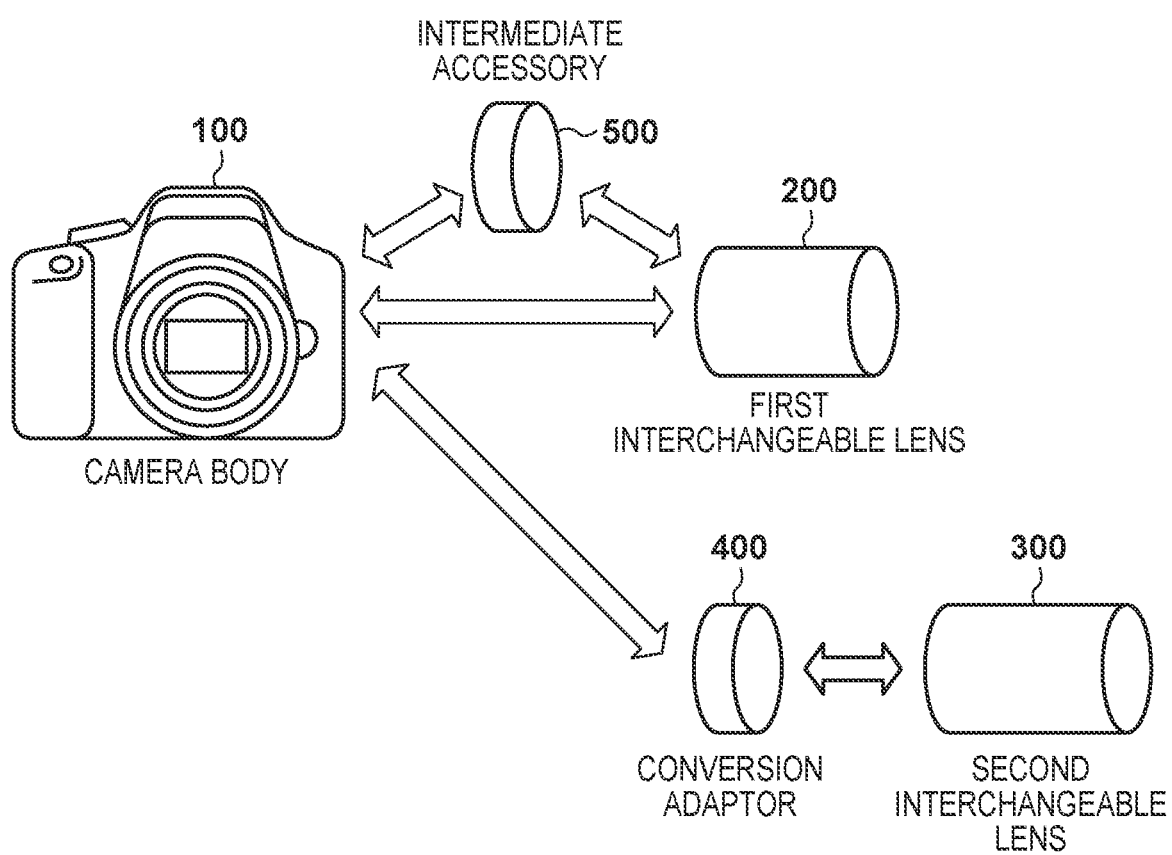
FIG. 1 schematically illustrates an exemplary configuration of a camera system according to an embodiment.

FIG. 1 schematically illustrates a camera system according to an embodiment. The camera system includes an interchangeable lens digital camera body (hereinafter, referred to as the camera body) 100 and auxiliary devices attachable to and detachable from the camera body 100. FIG. 1 illustrates a mount unit as an example of an attachment part included in the camera body 100 to which an auxiliary device can be attached, and also illustrates varying combinations of the mount unit and the auxiliary devices including interchangeable lenses, a conversion adaptor, and an intermediate accessory that can be attached to the mount unit. Here, the mount unit is an example of the attachment part included in the camera body 100 and is a part to which the auxiliary device is to be attached and may be a different type of attachment part, such as a hot shoe or an external interface (I/F). The auxiliary devices may also be any other device that can be attached to the attachment part.

Here, the auxiliary devices that can be attached to a lens mount are a first interchangeable lens 200, a second interchangeable lens 300, a conversion adaptor 400, and an intermediate accessory 500. Each of the first interchangeable lens 200 and the second interchangeable lens 300 is an example of an auxiliary device that has a noise source. Each of the conversion adaptor 400 and the intermediate accessory 500 is an example of an auxiliary device that does not have a noise source.

The first interchangeable lens 200 can be directly attached to the camera body 100. Moreover, the first interchangeable lens 200 can also be attached to the camera body 100 via the intermediate accessory 500. On the other hand, the second interchangeable lens 300 cannot be directly attached to the camera body 100. The second interchangeable lens 300 can be attached to the camera body 100 only via the conversion adaptor 400. Neither the conversion adaptor 400 or the intermediate accessory 500 alone is independently attached to the camera body 100, and are to be attached between a corresponding interchangeable lens and the camera body 100. The intermediate accessory 500 may be, but not limited to, a teleconverter. The conversion adaptor 400 may be, but not limited to, a mount adaptor (or a mount converter).

The camera body 100 and the auxiliary device include respective mount units shaped corresponding to each other. For typical attachment of the auxiliary device to the camera body 100, the respective mount units of the camera body 100 and the auxiliary device are joined opposing each other at a specific relative position and then the camera body 100 and the auxiliary device are rotated relative to each other. For example, each of the mount units include a plurality of tabs that enable the mount units to be attached to and detached from each other according to a so-called bayonet attachment mechanism. This mechanism allows the tabs of the mutually-opposite mount units to engage with each other when these mount units are joined opposing each other at the specific relative position and then the camera body 100 and the auxiliary device are rotated relative to each other. Each of the mount units includes a plurality of pins (electrodes or contacts). These pins of the mount units come into contact with each other when the mount units are attached to each other, and enable the camera body 100 to supply power to the auxiliary device and communicate with the auxiliary device. When the auxiliary device is to be detached from the camera body 100, a reverse procedure of the attachment procedure is performed. Although the detachment procedure may vary depending on the respective mechanisms of the mount units, the present invention is not dependent on the detachment procedure.

Figure 2:
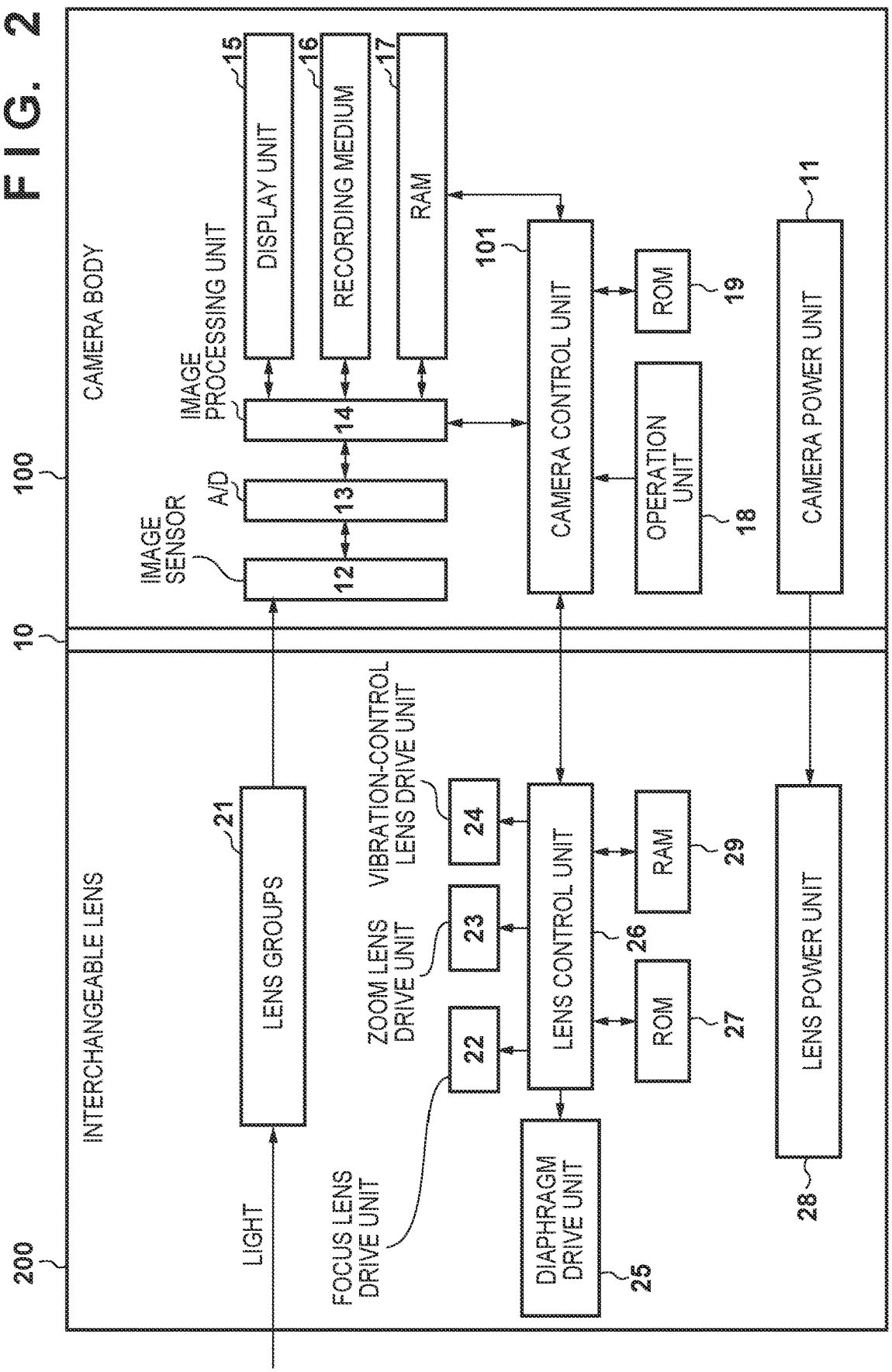
FIG. 2 is a block diagram illustrating an exemplary functional configuration of a camera system according to an embodiment.

FIG. 2 is a block diagram illustrating an exemplary functional configuration of the camera system in which the first interchangeable lens 200 is directly attached to the camera body 100, as one of the combinations illustrated in FIG. 1.

The camera body 100 includes a camera power unit 11 for supplying power to each block of the camera body 100. The camera power unit 11 supplies power not only to the camera body 100 but also to the first interchangeable lens 200 attached to the camera body 100 via a mount 10. The mount 10 is a collective designation for the mount units of the camera body 100 and the first interchangeable lens 200.

Furthermore, the camera body 100 includes an image sensor 12. The image sensor 12 includes a matrix of pixels, each of which has a photoelectric conversion unit. The image sensor 12 uses the pixels to perform photoelectric conversion on an optical image formed by lens groups 21 included in the first interchangeable lens 200, and then outputs a group of analog electric signals corresponding to the optical image. An analog-to-digital (A/D) conversion unit 13 converts the group of analog electric signals output from the image sensor 12 into a group of digital signals (RAW image data). An image processing unit 14 applies various image processes to the RAW image data to generate image data depending on an application. For example, the image processing unit 14 generates image data to be displayed on a display unit 15 and image data to be recorded in a recording medium 16. Moreover, the image processing unit 14 performs a process depending on an application of the image data, such as a superimposition process for on-screen display (OSD) data and graphical user interface (GUI) data, an encoding process, or a data-file generation process. Furthermore, the image processing unit 14 also performs a process (a decoding process, for example) to reproduce image data read from the recording medium 16.

Moreover, the image processing unit 14 is capable of generating evaluation values for automatic exposure control (AE) and automatic focusing (AF) using the RAW image data or the generated image data. The image processing unit 14 then supplies the evaluation values to a camera control unit 101.

The display unit 15 displays information regarding the camera system, a shot or reproduced image, or the GUI, for example. The recording medium 16 is a semiconductor memory card, for example and is used for recording data, such as image and audio data obtained through shooting.

A RAM 17 is a buffer memory used by the image processing unit 14 to temporarily store the image data. The RAM 17 is also used as a system memory to load a program to be executed by the camera control unit 101 and to store, for example, variables used for executing the program.

A ROM 19 stores a program to be executed by the camera control unit 101, various setting values of the camera body 100, and the GUI data, for example. The ROM 19 may be electrically rewritable.

An operation unit 18 is a collective designation for a group of input devices used by a user to give instructions to the camera body 100. The operation unit 18 includes a power switch, a shutter button, a video recording button, a menu button, arrow keys, an OK key, and a shooting/reproduction mode selector switch. Note that these are merely examples and that other buttons and switches for functions different from the above may be included.

The camera control unit 101 is a programmable processor, such as a CPU. To realize a function of the camera system, the camera control unit 101 loads a program stored in the ROM 19 to the RAM 17 and executes the program to control operations of the camera body 100 and the auxiliary device attached to the camera body 100, for example. Upon detecting an operation made on the operation unit 18, for example, the camera control unit 101 executes a shooting process or the like for a still image or video in response to the detected operation. The camera control unit 101 also executes an AF process and an AE process based on the evaluation values generated by the image processing unit 14. In the AF and AE processes, the camera control unit 101 communicates with the first interchangeable lens 200 (a lens control unit 26) via the mount 10 to control driving of a focus lens and a diaphragm of the first interchangeable lens 200.

The first interchangeable lens 200 has lens groups 21 including movable members, such as the focus lens, a zoom lens, a vibration control lens, and the diaphragm. To control actuators and motors for driving these movable members, the first interchangeable lens 200 also includes a focus lens drive unit 22, a zoom lens drive unit 23, a vibration-control lens drive unit 24, and a diaphragm drive unit 25. The lens control unit 26 controls operations of the focus lens drive unit 22, the zoom lens drive unit 23, the vibration-control lens drive unit 24, and the diaphragm drive unit 25.

The lens control unit 26 is a programmable processor, such as a CPU. To control the operations of the units included in the first interchangeable lens 200, the lens control unit 26 loads programs stored in a ROM 27 to a RAM 29 and executes the program, for example. Moreover, the lens control unit 26 communicates with the camera control unit 101 via the mount 10. With this communication, the lens control unit 26 transmits information (accessory information) regarding the first interchangeable lens 200 to the camera control unit 101 and controls the operations of the first interchangeable lens 200 in response to a request from the camera control unit 101. The ROM 27 stores the information and setting values of the first interchangeable lens 200, in addition to the programs to be executed by the lens control unit 26.

In the present embodiment, the ROM 27 stores location information regarding predetermined noise sources included in the first interchangeable lens 200, as a part of the accessory information. The location information regarding the predetermined noise sources may indicate a distance from an end part of the interchangeable lens on the attachment side (a mount surface in the present embodiment) to the noise source nearest to this end part, for example. The predetermined noise sources include circuits that have motors and actuators for driving the movable members, such as the focus lens drive unit 22, the zoom lens drive unit 23, the vibration-control lens drive unit 24, and the diaphragm drive unit 25. Moreover, the predetermined noise sources may also include a board on which the lens control unit 26 and the lens power unit 28 are installed. This is because power for actuating the focus lens drive unit 22, the zoom lens drive unit 23, the vibration-control lens drive unit 24, and the diaphragm drive unit 25 is supplied through this board, meaning that the largest amount of current passes through this board. Moreover, this board is often disposed closer to the mount surface of the interchangeable lens than the circuits of the drive units disposed near the respective movable members to drive.

The structural component having the location information to be stored as the location information regarding the noise source is determined based on the structure of the interchangeable lens. Thus, when the location information regarding the noise source is stored in the ROM 27 at the time of manufacture, for example, the determination of the structural component having the location information to be stored as the location information regarding noise source is made according to the interchangeable lens. Here, the predetermined noise sources are not limited to the above examples. The predetermined noise sources may differ depending on the model or type of the auxiliary device.

The lens power unit 28 provides the structural components of the first interchangeable lens 200 with power supplied from the camera power unit 11 of the camera body 100 via the mount 10.

Figure 3:
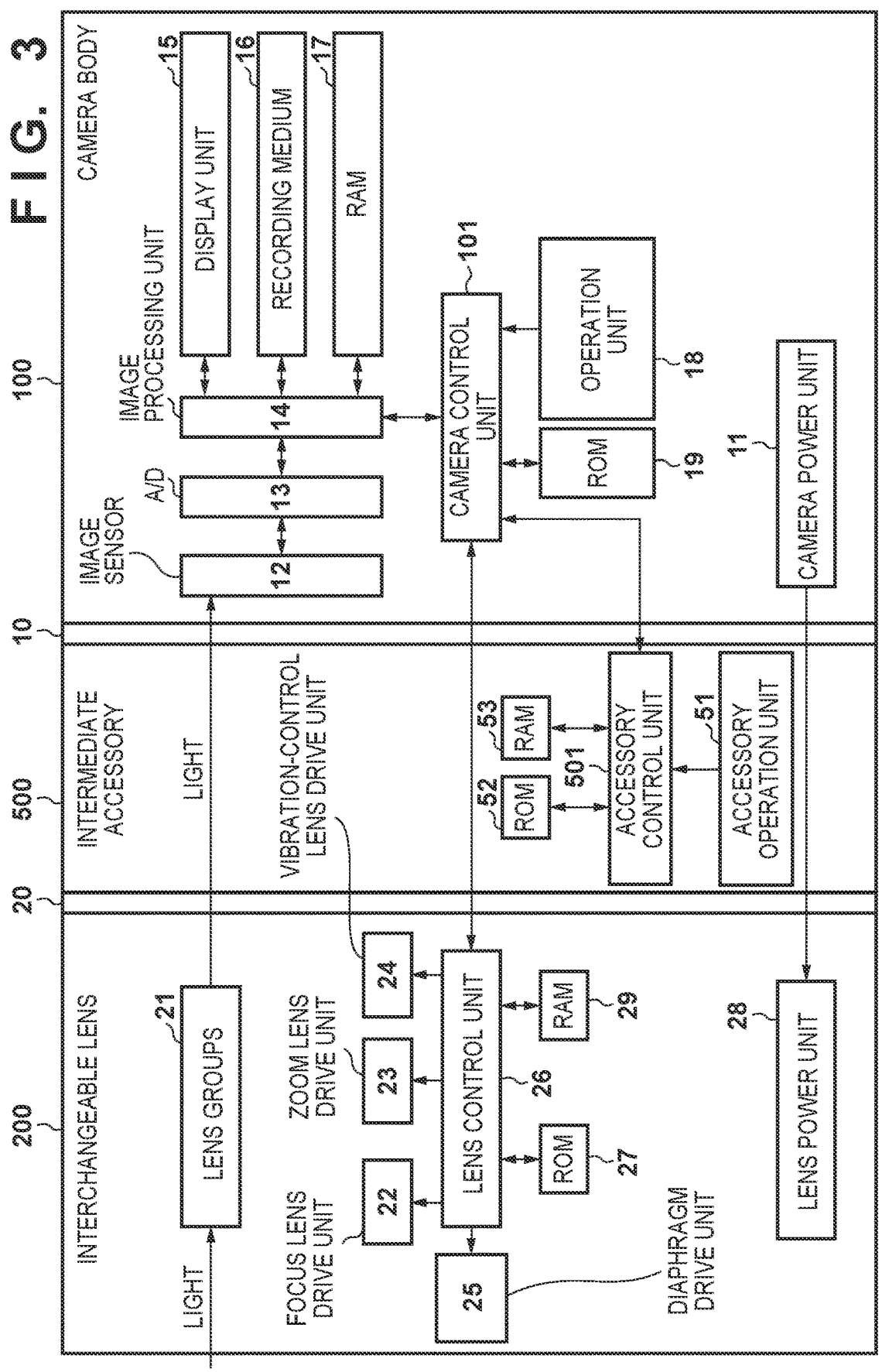
FIG. 3 is a block diagram illustrating another exemplary functional configuration of a camera system according to an embodiment.

FIG. 3 is a block diagram illustrating an exemplary functional configuration of the camera system in which the first interchangeable lens 200 is attached to the camera body 100 via the intermediate accessory 500, as one of the combinations illustrated in FIG. 1. In FIG. 3, the same structural components as those in FIG. 2 are assigned the same reference numerals as in FIG. 2, and description of these structural components is omitted.

The intermediate accessory 500 includes a camera-side mount unit and a lens-side mount unit. The camera-side mount unit has the same structure as the mount unit of the first interchangeable lens 200. The lens-side mount unit has the same structure as the mount unit of the camera body 100. Accordingly, the intermediate accessory 500 is attachable to and detachable from the camera body 100, as with the first interchangeable lens 200. Here, the first interchangeable lens 200 is also attachable to and detachable from the intermediate accessory 500 in the same manner for the camera body 100.

The intermediate accessory 500 is supplied with power from the camera body 100 via the camera-side mount unit and communicates with the camera body 100 (the camera control unit 101). Moreover, the intermediate accessory 500 supplies the power from the camera body 100 to the first interchangeable lens 200 via the lens-side mount unit. Furthermore, the intermediate accessory 500 provides a communication path between the camera body 100 (the camera control unit 101) and the first interchangeable lens 200 (the lens control unit 26). Thus, the camera body 100 (the camera control unit 101) and the first interchangeable lens 200 (the lens control unit 26) can communicate with each other as if directly connected to each other.

In FIG. 3, the mount 10 is a collective designation for the mount unit of the camera body 100 and the camera-side mount unit of the intermediate accessory 500. Moreover, the mount 30 is a collective designation for the lens-side mount unit of the intermediate accessory 500 and the mount unit of the first interchangeable lens 200.

An accessory control unit 501 of the intermediate accessory 500 is a programmable processor, such as a CPU. To communicate with the camera control unit 101 via the mount unit 10, the accessory control unit 501 loads a program stored in a ROM 52 to a RAM 53 and executes the program, for example. Moreover, the accessory control unit 501 executes an operation that corresponds to an operation made on or the state of an accessory operation unit 51 included in the intermediate accessory 500. The ROM 52 stores information (accessory information) and setting values of the intermediate accessory 500, in addition to the program to be executed by the accessory control unit 501.

In the configuration shown in FIG. 3, the intermediate accessory 500 is interposed between the first interchangeable lens 200 and the camera body 100. Thus, as compared with the configuration of FIG. 2 where the first interchangeable lens 200 is directly attached to the camera body 100, the distance between the first interchangeable lens 200 and the image sensor 12 of the camera body 100 is longer. Because the noise source (such as an actuator or motor) in the first interchangeable lens 200 is farther from the image sensor 12, the image sensor 12 is less affected by the noise source of the first interchangeable lens 200.

Figure 4:
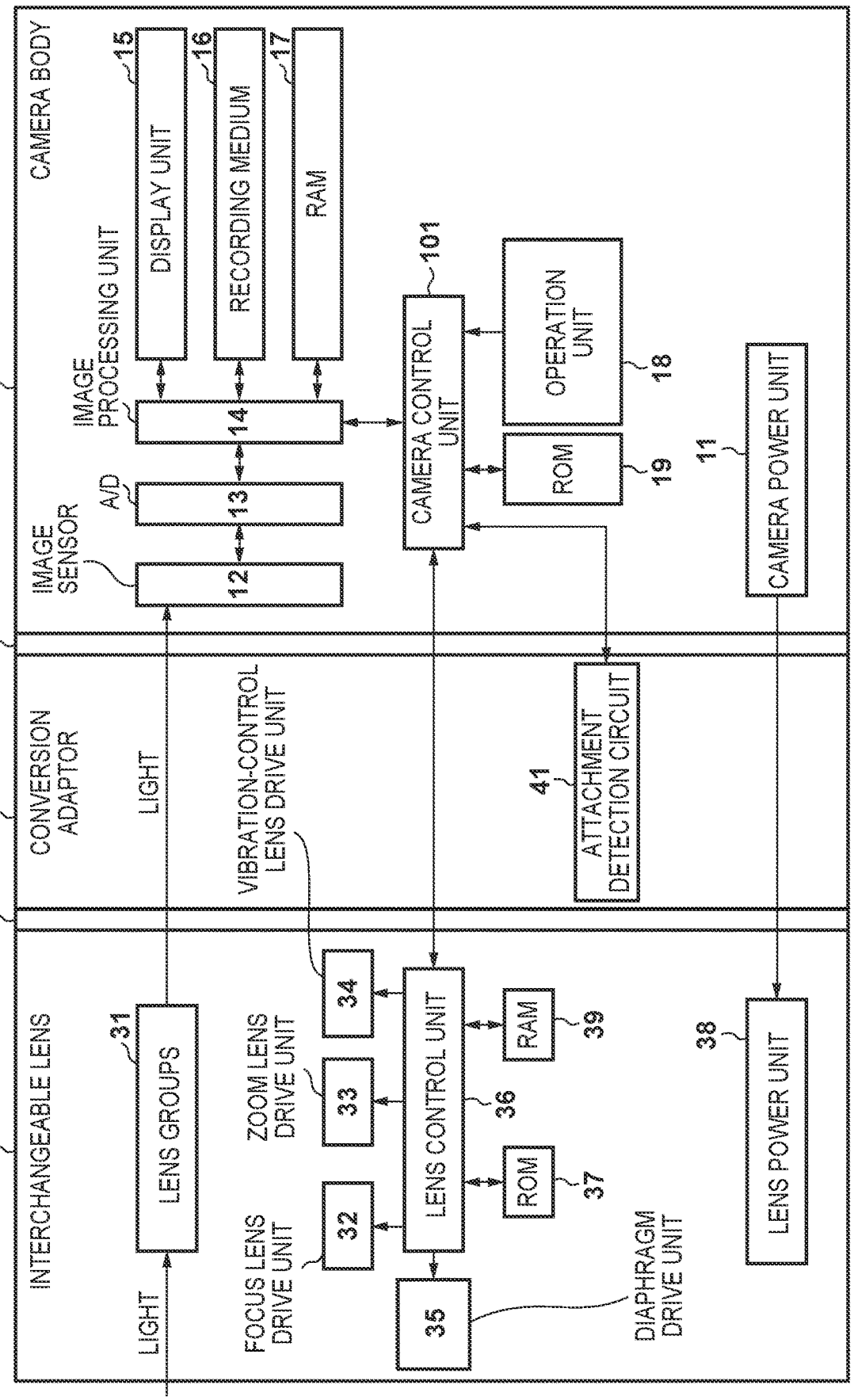
FIG. 4 is a block diagram illustrating yet another exemplary functional configuration of a camera system according to an embodiment.

FIG. 4 is a block diagram illustrating an exemplary functional configuration of the camera system in which the second interchangeable lens 300 is attached to the camera body 100 via the conversion adaptor 400, as one of the combinations illustrated in FIG. 1. In FIG. 4, the same structural components as those in FIG. 2 are assigned the same reference numerals as in FIG. 2, and description of these structural components is omitted.

The conversion adaptor 400 includes a camera-side mount unit and a lens-side mount unit, as with the intermediate accessory 500. The camera-side mount unit has the same structure as the mount unit of the first interchangeable lens 200. The lens-side mount unit has a structure that is different from the structure of the mount unit of the camera body 100 and that corresponds to a mount unit of the second interchangeable lens 300. Accordingly, the conversion adaptor 400 is attachable to and detachable from the camera body 100, as with the first interchangeable lens 200. The mount unit of the second interchangeable lens 300 is not shaped corresponding to the mount unit of the camera body 100. For this reason, the second interchangeable lens 300 cannot be directly attached to the camera body 100. On the other hand, the lens-side mount unit of the conversion adaptor 400 has a structure that corresponds to the mount unit of the second interchangeable lens 300. Thus, the second interchangeable lens 300 can be attached to the conversion adaptor 400. In this way, the conversion adaptor 400 enables an interchangeable lens with a mount unit that is not shaped corresponding to the camera body 100 to be attached to the camera body 100.

The conversion adaptor 400 supplies power supplied from the camera body 100 to the second interchangeable lens 300 via the lens-side mount unit. Moreover, the conversion adaptor 400 provides a communication path between the camera body 100 (the camera control unit 101) and the second interchangeable lens 300 (a lens control unit 36).

Note that the second interchangeable lens 300 is capable of directly communicating with the camera body 100 in the present example. Here, when no communication and/or no command compatibility is established between the second interchangeable lens 300 (the lens control unit 36) and the camera body 100 (the camera control unit 101), the communication between the second interchangeable lens 300 and the camera body 100 may be established via the conversion adaptor 400. In this case, the conversion adaptor 400 converts the content of communication received from the camera body 100 into a form that allows the second interchangeable lens 300 to interpret the content, and then transmits the converted content to the second interchangeable lens 300. Moreover, the conversion adaptor 400 converts the content of communication received from the second interchangeable lens 300 into a form that allows the camera body 100 to interpret the contents, and then transmits the converted content to the camera body 100. Such a conversion operation is achieved as a result of the conversion adaptor 400 being provided with a microprocessor (an adaptor control unit), a ROM, and a RAM, for example, and the adaptor control unit loading a conversion operation program stored in the ROM to the RAM and executing the program.

In FIG. 4, the mount 10 is a collective designation for the mount unit of the camera body 100 and the camera-side mount unit of the conversion adaptor 400. Moreover, the mount 30 is a collective designation for the lens-side mount unit of the conversion adaptor 400 and the mount unit of the second interchangeable lens 300.

The conversion adaptor 400 includes an attachment detection circuit 41 that enables the camera body 100 to detect attachment of the conversion adaptor 400 to the camera body 100. When supplied with power via the mount 10, for example, the attachment detection circuit 41 may set a potential of a specific pin from among the plurality of pins provided for the mount 10 to a specific value. Alternatively, the attachment detection circuit 41 may transmit information (accessory information) regarding the conversion adaptor 400 to the camera body 100 (the camera control unit 101), and may also be a memory that stores the information regarding the conversion adaptor 400 and be accessible to the camera body 100. For example, the attachment detection circuit 41 may make a notification of or store the accessory information including information regarding the thickness of the conversion adaptor 400 (i.e., the distance between the mount surfaces).

The structural components included in the second interchangeable lens 300 and having the same names as those in the first interchangeable lens 200 illustrated in FIG. 2 or FIG. 3 realize the same functions as those of the first interchangeable lens 200. In the present embodiment, the second interchangeable lens 300 has no unique structural component and thus an individual description for each structural component is omitted. Note that the location information regarding the noise source is stored in advance in a ROM 37, as a part of the accessory information regarding the second interchangeable lens 300.

As also illustrated in FIG. 4, the conversion adaptor 400 is interposed between the second interchangeable lens 300 and the camera body 100, similarly to the configuration in FIG. 3. Thus, as compared with a configuration where the second interchangeable lens 300 can be directly attached to the camera body 100, the distance between the second interchangeable lens 300 and the image sensor 12 of the camera body 100 is longer.

FIG. 5A illustrates an example of power supply information used for controlling power supplied from the camera body 100 via the mount unit. The power supply information is stored in advance in the ROM 19 of the camera body 100, the ROM 27 of the first interchangeable lens 200, and the ROM 37 of the second interchangeable lens 300. In the present embodiment, the power supplied from the camera body 100 via the mount unit is controlled using four different power modes. However, the number of power modes may be any number greater than one. The following describes the first interchangeable lens 200 as a typical example, and, unless otherwise stated, the following description is also applicable to the second interchangeable lens 300.

The camera control unit 101 determines the power mode of the camera body 100 at least according to the distance between the noise source of the attached auxiliary device and the image sensor 12, as described in detail later. Then, the camera control unit 101 transmits the determined power mode to the camera power unit 11 and the lens control unit 26. The camera power unit 11 controls power supplied from the mount unit so that the supplied power does not exceed a maximum power corresponding to the power mode received from the camera control unit 101. For example, when the camera control unit 101 determines "Full Power Mode" as the power mode, the camera power unit 11 supplies power to the lens power unit 28, with 10 W being the upper limit. When the camera control unit 101 determines "Low Power Mode" as the power mode, the camera power unit 11 supplies power to the lens power unit 28, with 3 W being the upper limit.

The lens control unit 26 refers to the power supply information stored in the ROM 27 on the basis of the power mode received from the camera control unit 101, and recognizes a maximum power to be supplied from the camera body 100. Then, the lens control unit 26 notifies the lens power unit 28 of the maximum power. The lens power unit 28 adjusts the amount of power supply to the units so that the amount does not exceed the notified maximum power. For a smaller maximum power supply, the lens power unit 28 reduces power consumption of the focus lens drive unit 22, the zoom lens drive unit 23, the vibration-control lens drive unit 24, and the diaphragm drive unit 25 that drive the movable members included in the interchangeable lens. To be more specific, speeds at which the movable members are shifted are reduced. This reduces noise caused by the interchangeable lens. On the other hand, an increase in power consumption of the interchangeable lens increases possible ripple current and magnetic noise from the noise source, which is likely to have an adverse affect on a shot image.

When Full Power Mode is received as the power mode from the camera body 100, for example, the lens power unit 28 supplies power so that total power consumption of the units is 10 W or less. When Low Power Mode is received as the power mode from the camera body 100, the lens power unit 28 supplies power so that the total power consumption of the units is 3 W or less.

Note that the camera control unit 101 may transmit the maximum power value itself instead of the power mode. In this case, no power supply information needs to be stored in the interchangeable lens, and the lens control unit 26 notifies the lens power unit 28 of the maximum power value received from the camera body 100. Then, the lens power unit 28 controls power supply to the interchangeable lens so that the supplied power does not exceed the notified maximum power value.

FIG. 5B illustrates examples of the power modes stored in the ROM 19 of the camera body 100 in association with the distance between the noise source of the interchangeable lens and the image sensor 12. A higher ISO sensitivity makes the image sensor 12 more susceptible to magnetic noise. This diagram illustrates an example in which the power modes are associated with combinations of ISO sensitivity and the distance between the noise source of the interchangeable lens and the image sensor 12. However, the power mode may be determined according to the distance between the noise source of the interchangeable lens and the image sensor 12 without using the ISO sensitivity. As illustrated in FIG. 5B, with the same ISO sensitivity, the power mode is determined so that the maximum power supply is smaller for a second distance than for a first distance, the second distance being shorter than the first distance.

The camera body 100 determines the power mode according to the set ISO sensitivity and the distance between the noise source of the interchangeable lens and the image sensor 12. Typically, when a high ISO sensitivity is set for the camera body 100, the image sensor 12 becomes more susceptible to magnetic noise, and thus a shot image becomes more susceptible to noise from the noise source of the interchangeable lens. As illustrated in FIG. 5B, with the same distance between the noise source and the image sensor 12, the power mode is determined so that the maximum power supply is smaller for a second ISO sensitivity than for a first ISO sensitivity, the second ISO sensitivity being higher than the first ISO sensitivity.

As described above, the first interchangeable lens 200 and the second interchangeable lens 300 store the location information regarding the noise source in the ROM 27 and the ROM 37, respectively. Upon detecting attachment of the interchangeable lens to the camera body 100, the lens control unit 26 reads the location information regarding the noise source from the ROM 27 and outputs the read information to the camera control unit 101. Attachment of an interchangeable lens to the camera body 100 is detected when the camera body 100 is turned on in a state where the interchangeable lens is attached to the camera body 100, for example. Alternatively, attachment is detected when the interchangeable lens is attached to the camera body 100 in a state where the camera body 100 is on, for example. Note that the location information regarding the noise source may be a part of lens information to be transmitted from the interchangeable lens to the camera body 100 in initial processing for establishing communication with the camera body 100 (the camera control unit 101). Alternatively, upon detecting attachment of the interchangeable lens, the camera control unit 101 may explicitly request the lens control unit 26 to transmit the location information regarding the noise source. In response to this request, the lens control unit 26 may transmit the location information regarding the noise source to the camera control unit 101.

The camera control unit 101 is capable of storing the received location information in the RAM 17 or the ROM 19 in association with at least one of model information and a unique identifier of the interchangeable lens, and reusing the location information. More specifically, upon detecting attachment of an auxiliary device, such as an interchangeable lens, the camera control unit 101 obtains information regarding the auxiliary device during communication at the time of attachment detection. Then, if the location information regarding the corresponding noise source has been stored in advance, the camera control unit 101 uses this stored information. The information regarding the thickness (distance) of the intermediate accessory 500 or the conversion adaptor 400 may be similarly stored and reused.

The camera control unit 101 calculates the distance between the image sensor 12 and the noise source of the first interchangeable lens 200 using the location information regarding the noise source (in this case, information regarding the distance between the noise source and the mount surface) obtained from the lens control unit 26. The camera control unit 101 next obtains the currently-set ISO sensitivity from the RAM 17, for example. Then, the camera control unit 101 determines the power mode for the first interchangeable lens 200 by referring to the calculated distance and the table illustrated in FIG. 5B. To determine a power mode that reflects the ISO sensitivity, the camera control unit 101 may execute the AE process to determine the ISO sensitivity before determining the power mode.

In the ROM 19 of the camera body 100, for example, camera distance information indicating a distance between the image sensor 12 (an image capturing area, for example) and an attachment part (in this case, the mount surface opposite the mount unit of the interchangeable lens) of the camera body 100 to which the auxiliary device is attached can be stored in advance.

Suppose that the first interchangeable lens 200 is directly connected to the camera body 100 as illustrated in FIG. 2, for example. In this case, the distance between the noise source and the image sensor 12 is calculated by adding the distance indicated by the location information regarding the noise source received from the first interchangeable lens 200 to the distance indicated by the camera distance information read from the ROM 19. For example, when the distances indicated by the location information regarding the noise source and by the camera distance information are 10 mm and 25 mm, respectively, the distance between the noise source of the first interchangeable lens 200 and the image sensor 12 is 35 mm. Here, in a case of ISO 12800 sensitivity, the camera control unit 101 can determine the power mode for the first interchangeable lens 200 as "Mid".

On the other hand, in the case that the intermediate accessory 500 is interposed between the first interchangeable lens 200 and the camera body 100 as illustrated in FIG. 3, the length (thickness) of the intermediate accessory 500 needs to be reflected in calculation. Upon detecting attachment of the intermediate accessory 500 to the camera body 100 as in the case of detecting the interchangeable lens, the camera control unit 101 communicates with the accessory control unit 501 to obtain accessory distance information indicating the length (thickness) of the intermediate accessory 500. Here, the accessory control unit 501 may actively transmit the accessory distance information to the camera control unit 101 thus enabling the camera control unit 101 to obtain the accessory distance information, or the camera control unit 101 may explicitly request the accessory control unit 501 to transmit the accessory distance information.

Moreover, upon further detecting attachment of the first interchangeable lens 200 to the intermediate accessory 500, the camera control unit 101 communicates with the lens control unit 26 via the intermediate accessory 500 and obtains the location information regarding the noise source from the lens control unit 26. Here, if the location information regarding the noise source of the first interchangeable lens 200 itself or the same model as the first interchangeable lens 200 has been stored in the camera body 100 in advance, the camera control unit 101 may use this stored information instead of obtaining the information from the lens control unit 26, as described above.

The camera control unit 101 calculates the distance between the noise source and the image sensor 12 by adding together the distances respectively indicated by the location information regarding the noise source of the first interchangeable lens 200, by the accessory distance information, and by the camera distance information. For example, in the case where the distances indicated by the location information regarding the noise source, by the camera distance information, and by the accessory distance information are 10 mm, 25 mm, and 30 mm, respectively, the camera control unit 101 calculates the distance between the noise source and the image sensor 12 at 65 mm. Here, in a case of ISO 12800 sensitivity, the camera control unit 101 can determine the power mode for the first interchangeable lens 200 as "Full". In this way, the power mode is determined such that more power is supplied to the interchangeable lens when the intermediate accessory 500 is interposed than in the case where the intermediate accessory 500 is not interposed although the same interchangeable lens is attached. Thus, the interchangeable lens can operate without excessive limitations.

As shown in FIG. 4, in a case where the conversion adaptor 400 is interposed between the second interchangeable lens 300 and the camera body 100, the length (thickness) of the conversion adaptor 400 needs to be reflected in calculation. When adaptor distance information indicating the length (thickness) of the conversion adaptor 400 can be obtained from the conversion adaptor 400, the camera control unit 101 calculates the distance as in the case where the intermediate accessory 500 is attached.

However, there are also cases where the adaptor distance information cannot be obtained from the conversion adaptor 400 such as when the conversion adaptor 400 does not include a control unit capable of communicating with the camera control unit 101 or a memory accessible to the camera control unit 101. In this case, the camera control unit 101 may use the adaptor distance information stored in the ROM 19 in advance. The adaptor distance information can be stored as a value determined for each possible model or as a fixed value at the time of manufacture of the camera body 100. Alternatively, the user may select the model or directly enter the value through a menu screen, for example. In the case where the distances indicated by the location information regarding the noise source, by the camera distance information, and by the adaptor distance information are 10 mm, 25 mm, and 20 mm, respectively, the camera control unit 101 calculates the distance between the noise source and the image sensor 12 as 55 mm. Here, with ISO 12800 sensitivity, the camera control unit 101 may determine the power mode for the first interchangeable lens 200 as "High".

Note that, in a case where the accessory information is unobtainable not only from the conversion adaptor 400 but also from the intermediate accessory 500 or that the location information regarding the noise source is unobtainable from the first interchangeable lens 200 or the second interchangeable lens 300, the user may make settings similarly as described above.

Figure 6:
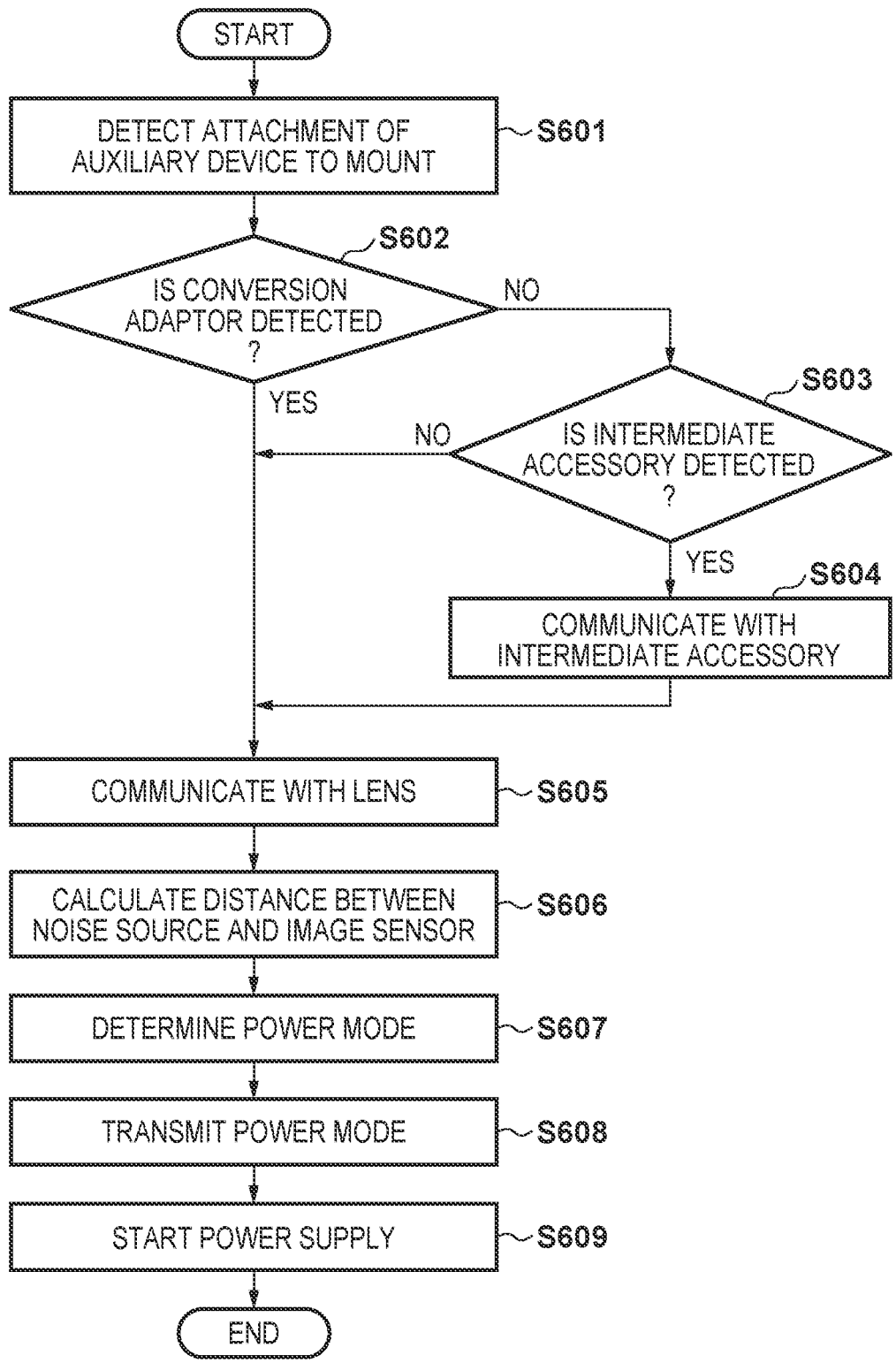
FIG. 6 is a flowchart of determining a power mode to be transmitted from a camera to an interchangeable lens.

FIG. 6 is a flowchart of the operation of the camera body 100 to determine the power mode.

In step S601, the camera control unit 101 detects attachment of an auxiliary device to the mount unit. The camera control unit 101 may detect attachment of the auxiliary device and the type of the attached auxiliary device based on a change in potential of a specific pin from among the plurality of pins provided for the mount unit, for example. However, the camera control unit 101 may detect the attachment by other methods.

In step S602, the camera control unit 101 determines whether the attached auxiliary devices include the conversion adaptor 400. If the camera control unit 101 determines that the attached auxiliary devices include the conversion adaptor 400, the processing proceeds to S605, otherwise the processing proceeds to S603. Note here that the adaptor distance information is not (or cannot be) obtained from the conversion adaptor 400. However, when the conversion adaptor 400 includes a control unit capable of communicating with the camera control unit 101 or a memory accessibly by the camera control unit 101, the adaptor distance information may be obtained from the conversion adaptor 400 as in step S604 described later.

In step S603, the camera control unit 101 determines whether the attached auxiliary devices include the intermediate accessory 500. If the camera control unit 101 determines that the attached auxiliary devices include the intermediate accessory 500, the processing proceeds to step S604. If not, the processing proceeds to step S605.

Here, if the camera control unit 101 is capable of specifying the type of one or more auxiliary devices attached to the mount unit of the camera body 100, steps S601 to S603 may be executed according to other procedures. For example, the attached auxiliary devices may be detected according to different methods based on differences in specifications of the mount units.

In step S604, the camera control unit 101 communicates with the accessory control unit 501 of the intermediate accessory 500 to obtain the accessory distance information.

In step S605, the camera control unit 101 communicates with the attached interchangeable lens and obtains the location information regarding the noise source from the lens control unit (or the memory) of the attached interchangeable lens and stores the obtained information into the RAM 17, for example.

In step S606, the camera control unit 101 calculates the distance between the noise source of the interchangeable lens and the image sensor 12 of the camera body 100. Moreover, when the ISO sensitivity for determining the power mode is to be reflected, the camera control unit 101 obtains the set ISO sensitivity from the RAM 17, for example. At this time, the camera control unit 101 may execute the AE process to determine the ISO sensitivity.

In step S607, the camera control unit 101 determines the power mode that corresponds to the distance calculated in step S606.

In step S608, the camera control unit 101 transmits the power mode determined in step S607 to the lens control unit of the attached interchangeable lens and to the camera power unit 11.

In step S609, the camera power unit 11 starts controlling the power supply via the mount unit according to the determined power mode. The lens control unit of the interchangeable lens notifies the lens power unit of the received power mode. Then, the lens power unit controls power supply to the units of the interchangeable lens so that the power supply does not exceed the maximum power supply corresponding to the notified power mode.

According to the present embodiment, the maximum power supplied from the image capture apparatus to the auxiliary device is limited based on the distance between the noise source of the auxiliary device attachable to the image capture apparatus and the image sensor of the image capture apparatus. This reduces noise caused by the auxiliary device and thus reduces the influence of noise caused by the auxiliary device on a shot image. Moreover, in a case where, for example, the distance between the image sensor and noise source interposed with another auxiliary device increases, even if the same auxiliary device is attached, the limit on the power supply may be eased. Thus, the auxiliary device can operate without excessive limitations. Furthermore, power supply to the same kind of auxiliary device having the noise source at a different location is appropriately controlled.

Although the present invention in an aspect has been described by way of the exemplary embodiment above, it should be obvious that the present invention is not limited to the exemplary embodiment described above. Various changes and modifications can be made unless such changes and modifications depart from the scope of claims according to the present invention. For an auxiliary device to be attached to a hot shoe, for example, location information regarding a noise source may indicate a distance between a contact of the hot shoe and the noise source closest to this contact of the hot shoe. By adding this distance to a distance between the image sensor and the contact of the hot shoe, a distance between the noise source and the image sensor is calculated. When an auxiliary device is attached to the mount unit and another auxiliary device is attached to the hot shoe, the power mode may be determined for each of these auxiliary devices by reflecting the noise source of the auxiliary device.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-125289, filed on Jun. 29, 2018, which is hereby incorporated by reference herein in its entirety.

What is claimed is:

1. An image capture apparatus, comprising:
one or more processors that, when executing a computer program stored in a memory, function as:
a determination unit configured to determine a maximum power to be supplied from the image capture apparatus to an auxiliary device detachably attached to the image capture apparatus, based on information regarding a distance between a noise source included in the auxiliary device and an image sensor included in the image capture apparatus; and
a control unit for controlling power supplied to the auxiliary device, without exceeding the maximum power determined by the determination unit,
wherein the determination unit determines the maximum power so that the maximum power to be smaller in a case where the distance based on the information is a second distance than in a case where the distance based on the information is a first distance, and
wherein the second distance is shorter than the first distance.

2. The image capture apparatus according to claim 1, wherein the auxiliary device is an accessory attachable to the image capture apparatus, and
the information is a part of accessory information regarding the accessory.

3. The image capture apparatus according to claim 1, wherein the information is location information regarding the noise source that is transmitted from the auxiliary device to the image capture apparatus when the auxiliary device is attached to the image capture apparatus.

4. The image capture apparatus according to claim 3, wherein the determination unit calculates the distance between the noise source and the image sensor based on:
a third distance between a part of the image capture apparatus at which the auxiliary device is attached and the image sensor; and
the location information.

5. The image capture apparatus according to claim 4, wherein, when the auxiliary device including the noise source is attached to the image capture apparatus via another auxiliary device that does not include a noise source, the determination unit calculates the distance between the noise source of the auxiliary device and the image sensor by taking a length of the another auxiliary device into consideration.

6. The image capture apparatus according to claim 5, wherein, when attachment of the another auxiliary device is detected, the determination unit obtains information regarding the length from the another auxiliary device.

7. The image capture apparatus according to claim 4, wherein the location information regarding the noise source is information indicates a fourth distance between a part of the auxiliary device to be attached to the image capture apparatus and the noise source nearest to the part of the auxiliary device.

8. The image capture apparatus according to claim 1, wherein the determination unit determines the maximum power, based on an International Organization for Standardization (ISO) sensitivity set for the image capture apparatus, in addition to the information regarding the distance between the noise source and the image sensor included in the image capture apparatus.

9. The image capture apparatus according to claim 8, wherein, for a same distance between the noise source and the image sensor included in the image capture apparatus, the determination unit determines the maximum power to be smaller for a second ISO sensitivity than for a first ISO sensitivity, the second ISO sensitivity being higher than the first ISO sensitivity.

10. The image capture apparatus according to claim 1, wherein the auxiliary device includes a mount unit that is shaped corresponding to a mount unit included in the image capture apparatus, and the auxiliary device is attachable to and detachable from the image capture apparatus via the mount unit of the auxiliary device.

11. The image capture apparatus according to claim 1, wherein the auxiliary device that has the noise source is an interchangeable lens.

12. The image capture apparatus according to claim 1, wherein the auxiliary device includes at least one of a conversion adaptor and an intermediate accessory, to both of which an interchangeable lens is attachable.

13. An auxiliary device of an image capture apparatus, the auxiliary device comprising:
a first memory that stores location information regarding a noise source included in the auxiliary device; and
one or more processors that, when executing a program stored in a second memory, function as:
an output unit configured to output the location information to the image capture apparatus to which the auxiliary device is attached, wherein, a maximum power that can be supplied from the image capture apparatus to the auxiliary device varies based on the location information.

14. An auxiliary device of an image capture apparatus, the auxiliary device comprising:
   a first memory that stores information regarding a length of the auxiliary device; and
   one or more processors that, when executing a program stored in a second memory, function as:
   an output unit configured to output the information regarding the length to the image capture apparatus to which the auxiliary device is attached,
   wherein, a maximum power that can be supplied from the image capture apparatus to the auxiliary device varies based on the information regarding the length.

15. The auxiliary device according to claim 14,
   wherein the auxiliary device is attachable to another auxiliary device.

16. A control method of an image capture apparatus, comprising:
   determining a maximum power to be supplied from the image capture apparatus to an auxiliary device detachably attached to the image capture apparatus, based on information regarding a distance between a noise source included in the auxiliary device and an image sensor included in the image capture apparatus; and
   supplying power to the auxiliary device, without exceeding the maximum power determined in the determining,
   wherein the determining determines the maximum power so that the maximum power to be smaller in a case where the distance based on the information is a second distance than in a case where the distance based on the information is a first distance, and
   wherein the second distance is shorter than the first distance.

17. A non-transitory computer-readable medium storing a program causing, when executed, a computer to function as an image capture apparatus, comprising:
   a determination unit configured to determine a maximum power to be supplied from the image capture apparatus to an auxiliary device detachably attached to the image capture apparatus, based on information regarding a distance between a noise source included in the auxiliary device and an image sensor included in the image capture apparatus; and
   a control unit for controlling power supplied to the auxiliary device, without exceeding the maximum power determined by the determination unit,
   wherein the determination unit determines the maximum power so that the maximum power to be smaller in a case where the distance based on the information is a second distance than in a case where the distance based on the information is a first distance, and
   wherein the second distance is shorter than the first distance.

* * * * *